(12) United States Patent
Thibeault et al.

(10) Patent No.: US 8,886,769 B2
(45) Date of Patent: Nov. 11, 2014

(54) SELECTIVE CONTENT PRE-WARMING IN CONTENT DELIVERY NETWORKS BASED ON USER ACTIONS AND CONTENT CATEGORIZATIONS

(71) Applicant: Limelight Networks, Inc., Tempe, AZ (US)

(72) Inventors: Jason Thibeault, Gilbert, AZ (US); Edgardo Nazario, Lynnwood, WA (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 13/744,834

(22) Filed: Jan. 18, 2013

(65) Prior Publication Data
US 2014/0207912 A1 Jul. 24, 2014

(51) Int. Cl.
- *G06F 15/16* (2006.01)
- *H04L 29/08* (2006.01)
- *G06F 12/08* (2006.01)
- *H04L 29/06* (2006.01)

(52) U.S. Cl.
CPC ............ *H04L 67/10* (2013.01); *G06F 12/0862* (2013.01); *H04L 65/4084* (2013.01); *H04L 67/2847* (2013.01)
USPC ........................................................ 709/219

(58) Field of Classification Search
CPC .......... G06F 12/0862; G06F 17/30902; H04L 65/4084; H04L 67/28; H04L 67/2847; H04L 29/06027; H04N 21/23106
USPC ........................................................ 709/219
See application file for complete search history.

(56) References Cited

U.S. PATENT DOCUMENTS

| 5,983,214 A | 11/1999 | Lang et al. |
| 6,269,275 B1 | 7/2001 | Slade |
| 6,754,699 B2 | 6/2004 | Swildens et al. |
| 6,917,960 B1 | 7/2005 | Decasper et al. |

(Continued)

FOREIGN PATENT DOCUMENTS

WO 2009087549 A2 7/2009

OTHER PUBLICATIONS

Xing Xie et al., "Enabling Personalization Services on the Edge", Retrieved on Feb. 25, 2013 from http://research.microsoft.com/en-us/people/xingx/enabling_personalization_services_on_the_edge.pdf, 2002, pp. 1-4, Microsoft.

*Primary Examiner* — John Macilwinen
(74) *Attorney, Agent, or Firm* — Kilpatrick Townsend & Stockton LLP (57) ABSTRACT

Systems and methods are provided for streaming content over the Internet via a CDN to an end user system. Requests from end user systems for streaming content objects being handled by the CDN are tracked to identify, for each request the tracked requests, a first content object being requested. For each request of the tracked requests, a category of the requested first content object is identified. The identified category is stored. Aggregated data indicating an amount of requests being for content objects with a specific category is generated. A prediction is made that a second content object will be requested in the future based on the aggregated data and a category of the second content object. Access to the second content object is improved such that the second content object is set to be provided faster in response to a request for the second content object than would otherwise occur.

20 Claims, 7 Drawing Sheets

(56) References Cited

U.S. PATENT DOCUMENTS

| | | | |
|---|---|---|---|
| 7,130,890 B1 * | 10/2006 | Kumar et al. | 709/218 |
| 7,231,496 B2 * | 6/2007 | Curtis | 711/137 |
| 2007/0156845 A1 | 7/2007 | Devanneaux et al. | |
| 2008/0065718 A1 * | 3/2008 | Todd et al. | 709/203 |
| 2012/0254917 A1 | 10/2012 | Burkitt et al. | |
| 2012/0272266 A1 | 10/2012 | Ou et al. | |

* cited by examiner

SELECTIVE CONTENT PRE-WARMING IN CONTENT DELIVERY NETWORKS BASED ON USER ACTIONS AND CONTENT CATEGORIZATIONS

BACKGROUND

This disclosure relates in general to identifying content to pre-cache in content delivery networks (CDNs). Specifically, user actions are monitored and/or content is categorized in order to predict which content objects will be accessed at specific geographic locations, making such objects suitable for pre-caching.

Users frequently request various content objects and expects that the objects be provided in a timely manner. Various options exist for improving the speed at which the objects can be delivered. For example, objects can be cached at a location near users and/or using high-speed resources. However, employing such techniques for a large set of objects is often prohibitively expensive. It would be desirable to identify a technique for selectively improving access to a subset of content objects in a manner that would continue to meet users' timeliness expectations.

SUMMARY

In one embodiment, the present disclosure provides a method and system for automatically identifying content and content portions for pre-caching at specific geographic locations in content delivery networks (CDNs) by analyzing users' actions and content categorizations. User requests for content objects are tracked in a geographically sensitive manner. Content objects are then aggregated based on categorizations of the objects (e.g., using metadata names or tags). Based on this analysis, a prediction is made as to how content-object classifications influence overall request probability, sequential request probability (e.g., whether a content object was requested prior to requesting other similar objects), and access behaviors (e.g., whether a content object was viewed in its entirety). The prediction is further made in a geographically sensitive manner. Based on the prediction, select content objects (e.g., likely to be accessed or likely to be first accessed by users) are identified and pre-cached in full or in part (e.g., based on an access-behavior prediction) at specific geographic locations in the CDN. Upon detecting a request from a user for the pre-cached full or partial content object, the object can be served. Further, a prediction can further be made as to which content object or part of a content object will be requested or desired by the user, and the content object or part of the content object can be retrieved (e.g., and cached).

In one embodiment, the present disclosure provides a method and system for automatically identifying content and content portions for pre-caching at specific geographic locations in content delivery networks (CDNs) based on content-group structures, such as playlists. Content-group structures can identify a set of ordered content objects. Thus, a user can access a content-group structure, and—in a default mode—the content objects in the set are provided to the user sequentially as ordered in the structure. Based on the order, a prediction is made as to which content objects a user will expect to be initially and quickly provided. This prediction is further made in a geographically sensitive manner based on where, within a CDN, the user associated with the structure is estimated to be. Based on the prediction, select content objects (e.g., likely to be accessed or likely to be first accessed by the user or a set of users) are identified and pre-cached in full or in part at specific geographic locations in the CDN. Upon detecting a request for the pre-cached full or partial content object, the object can be served. Further, a prediction can further be made as to which content object or part of a content object will be subsequently requested or desired, and the content object or part of the content object can be retrieved (e.g., and cached).

In some embodiments, a content delivery network (CDN) is provided for streaming content over the Internet to an end user system. A content request interface receives requests for streaming content objects to end user systems. An edge server selection function assigns each request to an edge server for streaming content to the end user system. A streaming function streams the requested streaming content object to the requesting end user systems. A content-request function tracks the requests for the streaming content objects to identify, for each request received by the content request interface, a first content object being requested. The content-request function further identifies, for each request received by the content request interface, a category of the requested first content object and stores the identified category. The content-request function also generates aggregated data indicating an amount of requests being for content objects with a specific category, predicts that a second content object will be requested in the future based on the aggregated data and based on a category of the second content object, and causes access to the second content object to be improved such that the second content object is set to be provided faster in response to a request for the second content object than would otherwise occur.

In some embodiments, a method is provided for streaming content over the Internet via a CDN to an end user system. Requests from end user systems for streaming content objects being handled by the CDN are tracked to identify, for each request the tracked requests, a first content object being requested. For each request of the tracked requests, a category of the requested first content object is identified. The identified category is stored. Aggregated data indicating an amount of requests being for content objects with a specific category is generated. A prediction is made that a second content object will be requested, via the CDN, in the future based on the aggregated data and based on a category of the second content object. Access to the second content object is caused to be improved such that the second content object is set to be provided faster in response to a request for the second content object than would otherwise occur.

In some embodiments, a system for streaming content over the Internet to an end user system is provided. The system includes one or more processors and one or memories coupled with said one or more processors. The one or more processors and one or more memories are configured to track requests from end user systems for streaming content to identify, for each request the tracked requests, a first content object being requested and to identify, for each request of the tracked requests, a category of the requested first content object. The one or more processors and one or more memories are further configured to store the identified category and generate aggregated data indicating an amount of requests being for content objects with a specific category. The one or more processors and one or more memories are also configured to predict that a second content object will be requested, via the CDN, in the future based on the aggregated data and based on a category of the second content object and to cause access to the second content object to be improved such that the second content object is set to be provided faster in response to a request for the second content object than would otherwise occur.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

In the appended figures, similar components and/or features may have the same reference label. Where the reference label is used in the specification, the description is applicable to any one of the similar components having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
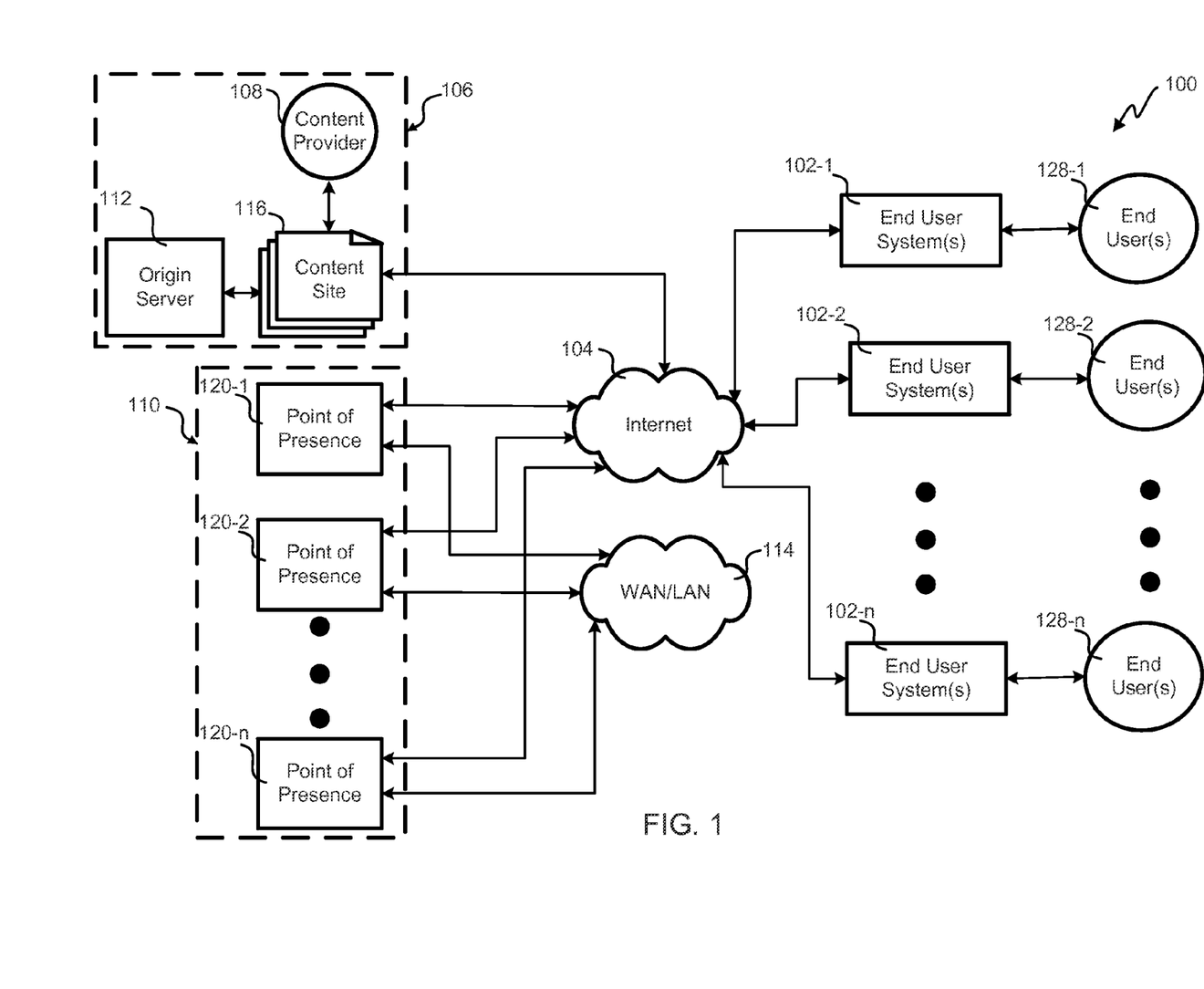
FIG. 1 depicts a block diagram of an embodiment of a content distribution system.

Referring first to FIG. 1, a block diagram of an embodiment of a content distribution system 100 is shown. A content originator 106 produces and/or distributes content objects and includes a content provider 108, a content site 116, and an origin server 112. Content originator 106 offloads delivery of the content objects to a content delivery network (CDN) 110 in this embodiment. CDN 110 can respond to user requests by, e.g., accessing and processing requested content. Thus, as described further below, CDN 110 can include components that identify tasks to be performed, prioritize these tasks and distribute workload of the tasks across a set of resources.

CDN 110 can both cache and/or host content in various embodiments for third parties to offload delivery and typically provide better quality of service (QoS) to a broad spectrum of end user systems 102 distributed worldwide. Content originator 106 is the customer of the CDN 110 and an end user 128 benefits from improvements in QoS.

In this embodiment, content distribution system 100 locates the content objects (or portions thereof) and distributes the content objects to an end user system 102. The content objects are dynamically cached within the CDN 110 and/or hosted by the CDN 110. A content object is any content file, content stream or a range defining a segment of a content file or content stream and could include, for example, video, pictures, data, audio, software, and/or text. The content object could be live, delayed or stored. The range defining a segment could be defined as a byte range or time range within the playback. A content object can include a customization structure including a customization list that specifies set of content objects and/or an order of the content objects in the set. The customization structure further includes the specified content objects. For example, the customization file can include a list of audio files or a list of video files. Thus, e.g., if an end user requests a customization structure (e.g., by requesting a movie that a content provider has tied to a customization file with inserted advertisements), the user may in essence be requesting a group of individual content objects. The specific files identified in a customization file may be chosen by a content provider, a third-party service or an end user. For example, a third-party service can identify a sequence of video portions and advertisement video clips, or an end user can identify an ordered list of songs to be played upon accessing a playlist. Throughout the specification, references may be made to a content object, content, content stream and/or content file, but it is to be understood that those terms could be used interchangeably wherever they may appear.

Many content providers 108 use a CDN 110 (or multiple CDNs) to deliver the content objects over the Internet 104 to end users 128. Content providers 108 can pay for this service, and different types or quality of service can be provided, e.g., based on specific contracts or prices paid by content providers 108. Content providers 108 can further interact with CDN 110, e.g., to request that specific processing be performed on their content, to specify policies regarding the processing (e.g., prioritizing a first type of processing over a second or to ensure that the processing is only handled by specific resources or resources of a specific type), or to specify policies regarding use of resources assigned to (e.g., paid for by) the content provider.

CDN 110 includes a number of points of presence (POPs) 120, which are geographically distributed through the content distribution system 100 to deliver content with lower latency. Various embodiments may have any number of POPs 120 within the CDN 110 that are generally distributed in various locations around the Internet 104 so as to be proximate to end user systems 102. Multiple POPs 120 use the same IP address such that an Anycast routing scheme is used to find a POP likely to be close to the end user, in a network and/or geographic sense, for each request. In addition to the Internet 104, a wide area network (WAN) and/or local area network (LAN) 114 or other backbone may couple the POPs 120 with each other and also couple the POPs 120 with other parts of CDN 110. Distributed storage, processing and caching is provided by CDN 110.

When an end user 128 requests a content through its respective end user system 102, the request for the content is passed either directly or indirectly via the Internet 104 to content originator 106. Content originator 106 is the source or re-distributor of content objects, i.e., the so-called origin server 112. Content site 116 is an Internet web site accessible by end user system 102. In one embodiment, content site 116 could be a web site where the content is viewable with a web browser. In other embodiments, content site 116 could be accessible with application software other than a web browser. Content provider 108 directs content requests to a CDN 110 after they are made or formulates the delivery path by embedding the delivery path into the universal resource indicators (URIs) for a web page. In any event, the request for content is handed over to CDN 110 in this embodiment by using an Anycast IP address corresponding to two or more POPs 120. In some embodiments, CDN 110 hosts content objects and/or web pages to be the origin server.

Once the request for a content object is passed to CDN 110, the request is associated with a particular POP 120 within CDN 110 using the Anycast routing scheme, but other embodiments could use routing, redirection or DNS to shunt requests to a particular POP 120. It is noted that CDN 110 processes requests for content in the application layer of the open systems interconnection (OSI) model with URIs, URLs and HTTP. The particular POP 120 may retrieve the portion of the content object from content provider 108 where it is acting as the origin server. Alternatively, content provider 108 may directly provide content object to the CDN 110 and its associated POPs 120 through pre-population of caches (i.e., in advance of the first request) or hosting. A storage policy could be defined to specify the conditions under which pre-population is performed. In this embodiment, the content objects are provided to CDN 110 and stored in one or more CDN servers such that the portion of the requested content may be hosted from CDN 110. CDN servers include edge servers in each POP 120 that actually serve end user requests. The origin server 112 holds a copy of each content object for the content originator 106. Periodically, the content of the origin server 112 may be reconciled with the CDN 110 through a caching, hosting and/or pre-population algorithm, for example, through a storage policy. Some content providers could use an origin server within the CDN 110 to host the content and avoid the need to maintain a copy.

Once the content object is retrieved, the content object is processed (e.g., transcoded) and/or stored within the particular POP 120 and is served from that POP to the end user system 102. End user system 102 receives the content object and can further process it for use by the end user 128. End user system 102 could be a personal computer, media player, handheld computer, tablet, pad, Internet appliance, phone, smart phone, IPTV set top, streaming radio or any other device that receives and plays content objects. In some embodiments, a number of the end user systems 102 could be networked together. Although this embodiment only shows a single content originator 106 and a single CDN 110, it is to be understood that there could be many of each in various embodiments.

Figure 2:
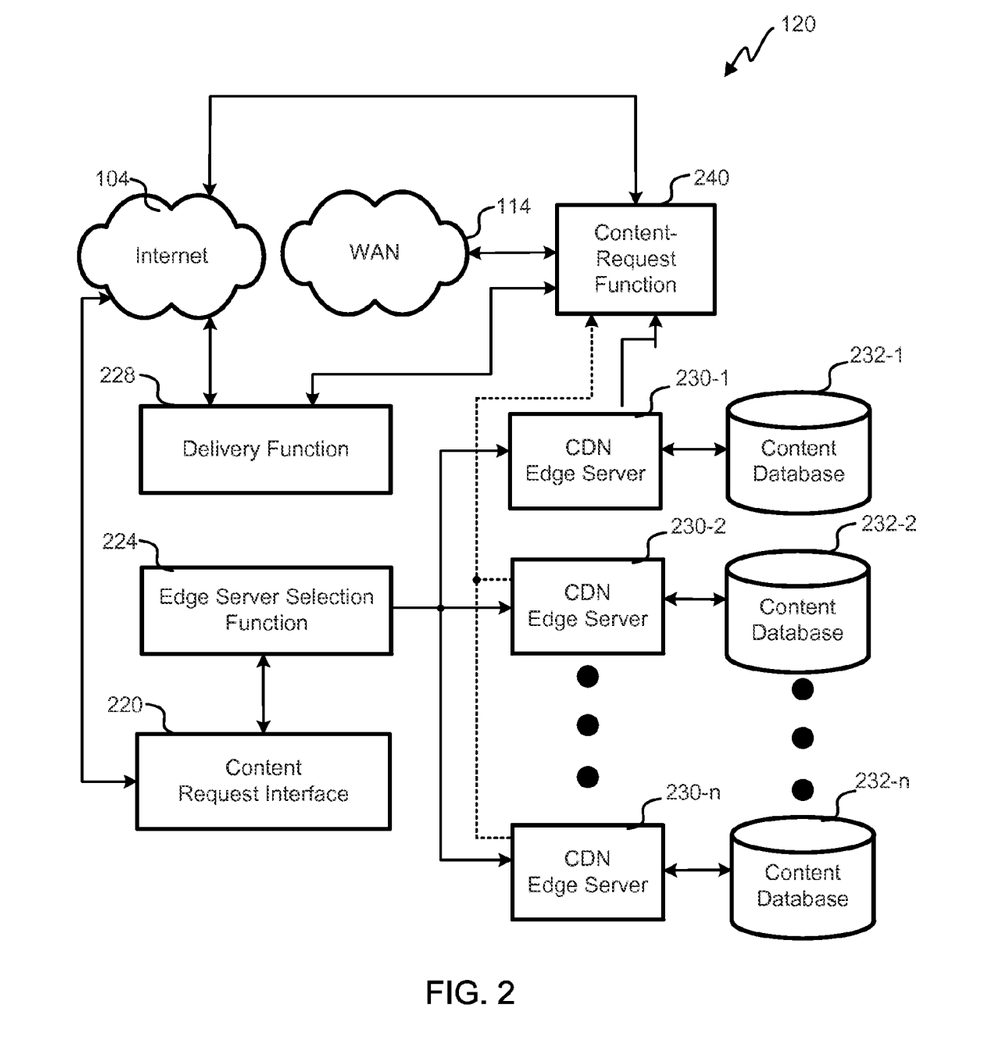
FIG. 2 depicts a block diagram of an embodiment of a content delivery network.

With reference to FIG. 2, a block diagram of an embodiment of a CDN 110 is shown. Although only one POP 120 is shown in detail, there are a number of POPs 120 similarly configured throughout the CDN 110. In this embodiment, the POP 120 may include a content request interface 220, an edge server selection function 224, a number of CDN edge servers 230 and their associated content databases 232, a content-request function 240, and a delivery function 228. An interface from the Internet 104 to the POP 120 accepts requests for content objects from end user systems 102. The requests come from an Internet protocol (IP) address of end user device 102 in the form of a URI that causes a HTTP get command. The interface from the Internet 104 to the POP 120 can further accept requests from content providers 108 to perform processing tasks on specific content objects or types of content objects and to define policies regarding processing related to content objects and/or resources associated with the content provider. The requests for content files from CDN 110, requests for processing tasks, or requests policy definitions can pass through the application layer. As explained above with respect to the FIG. 1, when a request for content is handed over to the CDN 110, it will be associated with a particular POP 120 within the CDN 110 through any number of algorithms. As described in further detail below, the assignment may be based on usage characteristics of the requested content, usage characteristics of other content similar to the requested content, and/or an estimated location of an end user system 102 transmitting the request.

The particular POP 120 receives the request for content object through the content request interface 220 and distributes the request to the edge server selection function 224. The edge server selection function 224 assigns the request for content to an edge server 230 according to a routing scheme such as round robin, load balancing, etc. Additionally or alternatively, the edge server selection function can assign the request based on a parameter, such as: a characteristic of the requested content object, servers assigned to a particular content provider, quality-of-service (QoS) to be provided for the content object or content provider, performance metrics or capabilities of various edge servers, routing efficiency between edge servers and the end user system 102, usage characteristics of the requested content, usage characteristics of other content similar to the requested content, and/or an estimated network or geographic location of an end user system transmitting the request. There are a number of mechanisms used by the edge server selection function 224 such as through the domain name service (DNS) resolution, by redirecting the request for a content object or other known mechanisms.

A content database 232 stores content objects or portions thereof along with information that is relevant to the characteristics of the content object. Examples of content object characteristics may include storage space available on the edge server, size of the content object, encoded format of the content object and content categorizations of the content object.

Once the request for content is assigned to the selected edge server 230, the content object characteristics from the content database 232, are used to determine a portion of the content object. The content-request function 240 gathers the content object characteristics and determines the portion of the content to request initially. In this embodiment, the content-request function 240 is used by a number of edge servers 230, but in other embodiments each edge server 230 could perform the content-request function 240 for the streams requested from the particular edge server 230.

As will be described further below in various embodiments, the step of determining the portion of the content object to cache initially is performed by the content-request function 240, which may use various algorithms. After determining the portion of the requested content, the content-request function 240 retrieves the portion of the content object from a remote location if not stored already in one of the content databases 232. The remote location may be an origin server 112 or another CDN server in the same or different POP 120. The portion of the requested content is then stored on the content database 232 such that the stored portion of the content object is accessible to the selected edge server 230.

The delivery function 228 delivers the portion of the requested content to the end user system 102. For example, the content may be streamed to the end user system 102 or delivered in full (e.g., via download) to the end user system.

Further, the delivery function 228 can deliver the portion of the requested content in response to subsequent requests for the content object. In some instances, the content-request function 240 determines a portion of the content object to request and cache even prior to receiving an initial request for the content object. In this embodiment, the delivery function 228 is shared by a number of edge servers 230, but in other embodiments, each edge server 230 includes its own delivery function 228. In some embodiments, the content-request function 240 and/or delivery function 228 is not local to a single POP 120 but is instead accessible to a group of POPs 120 or to all POPs 120 in the CDN 110. The delivery function 228, content-request function 240, edge server selection function 224, and content request interface 220 could be implemented in one or more servers, network appliances and/or switches.

Figure 3:
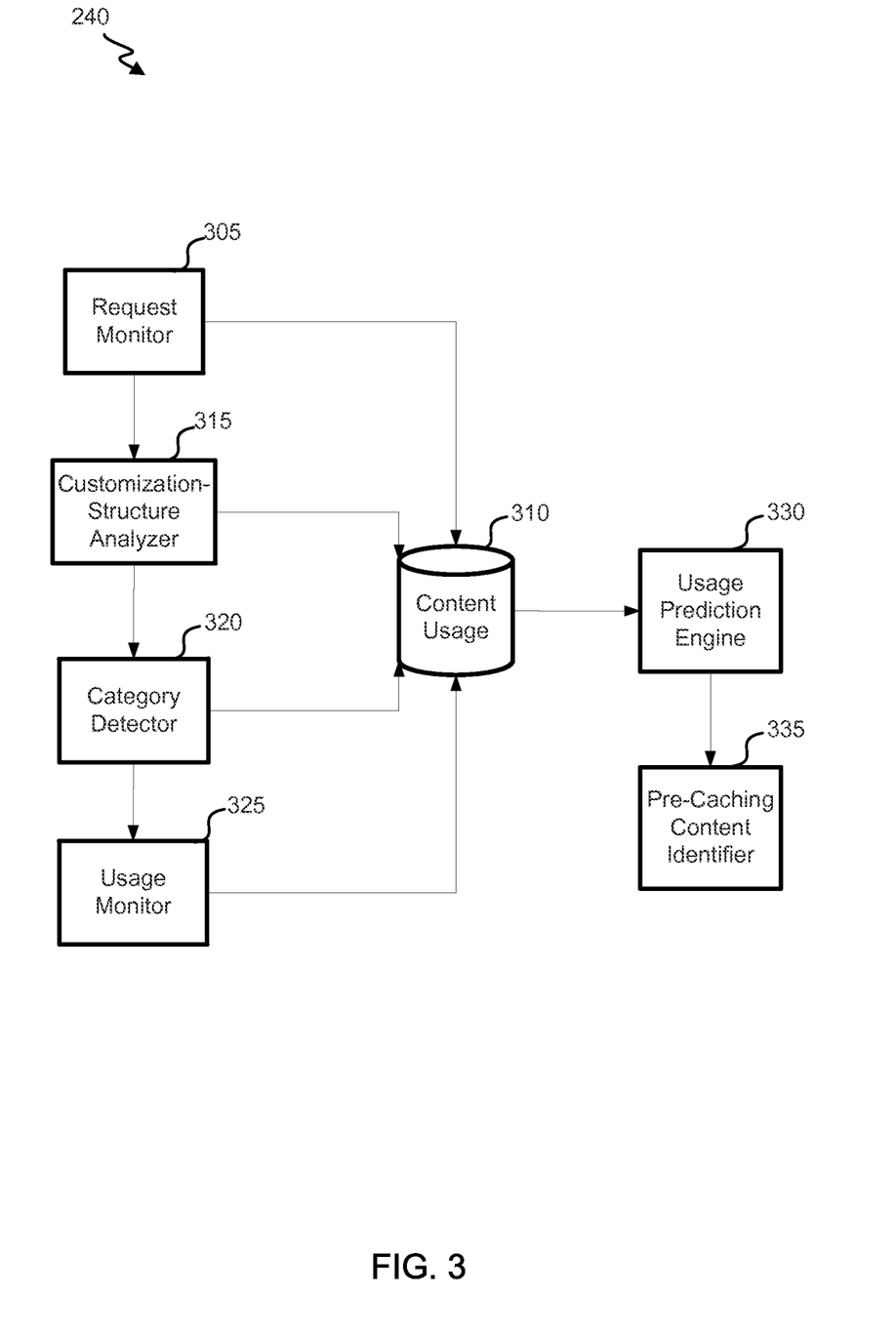
FIG. 3 depicts a block diagram of a content-request function.

With reference to FIG. 3, a block diagram of the content-request function 240 is shown. The content-request function includes a request monitor 305 that monitors for requests for content. Upon detecting such a request, the request monitor 305 identifies the requested content, a requesting end user system 102 requesting the content, a type of end user system requesting content, an end user 128 requesting the content (e.g., using an association between an end user 128 and an end user system 102 or IP address or using a received login), and/or a date and time of the request. Based on this information, the request monitor 305 can further determine or estimate a capability of the end user system 102, a desired format of the requested content, a content provider providing the requested content and/or a geographic location of the end user 128. The initially identified information and/or the estimated or determined information can be stored in a content-usage database 310. The information can be stored in a per-request basis (separately identifying pertinent information for each detected request) or in an aggregated manner (e.g., aggregating requests based on request receipt times, content providers and/or end-user geographic locations and storing distributions of other variables within each aggregated data group).

The request monitor 305 further alerts other components of the content-request function 240 upon detecting a request, such that further data can be collected and/or determined. FIG. 3 shows a successive alert sequence between the request monitor 305, a customization-structure analyzer 315, a category detector 320 and a usage monitor 325. However, it will be appreciated that the request monitor 305 can directly alert the category detector 320 and/or usage monitor 325.

The customization-structure analyzer 315 detects whether the requested content is a customization structure or a customization file. The customization-structure analyzer 315 can detect when a user requesting a single file is to be handled as a request for multiple files. For example, an end user 128 can request that a playlist be played. Thus, the customization structure can include the playlist itself, which identifies specific audio files and an order that the audio files are to be played, and the specific content files. As another example, an end user 128 can request that a video be played. Meanwhile, a content provider providing the video may have indicated that the video is to be spliced into a series of portions and advertisement videos are to be inserted between the portions. Thus, the request for the video results in a request for a file identifying the video portions and advertisements and the portions and advertisements themselves.

Upon determining that the request is to be handled by providing multiple content objects, the customization-structure analyzer 315 identifies the specific content objects (e.g., identified in the a customization file) and any provided object order. The objects and order are stored in the content-usage database 310. The length and/or size of the objects and/or one or more providers of the objects can further be stored in the content-usage database 310. In some instances, the customization file itself is stored in the content-usage database 310.

The category detector 320 detects one or more categories of requested content objects. For example, if a user requests a single content object that is not a customization structure, one or more categories can be identified for the object. As another example, if a user requests a customization structure, one or more categories can be identified for each content object therein. The categories can be identified in metadata (e.g., as tags) of the content objects, and may have been defined by a provider of the content objects. In some instances, the category detector 320 itself selects categories based on, e.g., a name of an object, a transcript or lyrics of the object and/or a description of the object. The category may be selected from a fixed or dynamic set of potential categories (e.g., selected using an ontology). The detected categories are then stored in the content-usage database 310.

The usage monitor 325 monitors the end-user system 102 that requested the content object to detect how the requested content object is accessed. For example, the usage monitor 325 can determine if the requested content object was fully played, or—if not—what portion was played. In instances in which a customization structure was requested, the usage monitor 325 can detect which of the content objects were accessed and in what order. For example, a user may request that songs on a playlist be played. However, rather than accessing the songs in an order identified in the playlist, the user may skip to select songs. The usage monitor 325 can detect this user-initiated access order and determine which songs were actually played. The detected usage pattern is stored in the content-usage database 310.

A usage prediction engine 330 then aggregates information in the content-usage database 310. The aggregation can be performed, e.g., based on request receipt times, content providers providing requested objects, requesting end users or end-user devices, and/or geographic locations of end users requesting objects. After the aggregation is performed, the usage prediction engine 330 can identify, e.g., which content object(s) or portions thereof were frequently requested, were frequently accessed, and/or were frequently requested or accessed prior to other requested or accessed objects. This identification can include, e.g., identifying content objects or portions thereof having an access or request rate above an absolute or relative threshold.

Based on the identification, the usage prediction engine 330 predicts which content objects or portions thereof will subsequently be requested or accessed (e.g., by a particular user, using at a particular edge server, at a rate above an absolute or relative threshold, or prior to the end user subsequently requesting or accessing other content object). The prediction can include a probability of requests or access.

In one instance, this prediction is reflective of past requests or usage patterns. That is, the usage prediction engine 330 predicts that content objects previously frequently requested or accessed (e.g., generally or within a time interview) will continue to be similarly requested or accessed in the future, and/or that content objects frequently requested or accessed before other content objects are requested or accessed will continue to be requested or accessed relatively early. This analysis may nonetheless constrain the predictions based on conditions of past requests. For example, the prediction may be specific to a single end-user device.

In one instance, this prediction is based on detected content categories. Specifically, rather than the usage prediction engine 330 identifying specific content objects or portions thereof likely to be requested, the usage prediction engine 330 can predict that content objects having specific categories are likely to be requested or accessed (e.g., in full or in part; or in general or before requesting or accessing other content objects). This prediction can allow the usage prediction engine 330 to predict usage patterns of content objects even if they are new to the CDN 110 or if there is minimal or new content-usage data stored in the content-usage database for the specific objects.

Based on the prediction, a pre-caching content identifier 335 can identify full or partial content objects to pre-cache (e.g., at an edge server or at a POP). In a simple scenario, the identified full or partial content objects can include those predicted to requested or accessed. In another scenario, the pre-caching content identifier 335 balances an objective to pre-cache content objects with practical considerations (e.g., finite storage space, allocation of storage space across multiple providers, incentives to implement some continuity about which content objects are pre-cached and/or content provider's prioritizations of serving different content objects). For example, a content provider can subscribe to a CDN service in which a content object is to be pre-cached if it predicted that a fixed percentage of users will request the object. In this case, the pre-caching content identifier 335 can compare the request predictions made by the usage prediction engine 330 to the client-identified percentage.

In one instance, this prediction is based on a location of an end user 128. Specifically, the usage prediction engine 330 can predict which content objects or portions thereof will be requested or accessed by a specific end user 128. The pre-caching content identifier 335 can then estimate an end user's location (e.g., based on recent requests assigned to the user) and conclude that the content objects or portions thereof should be stored at a server close (in a geographic or network sense) to the location. Thus, in some instances (e.g., instances in which the content-request function 240 is shared across edge servers or POPs or is in communication with other edge servers or POPs), the pre-caching content identifier 335 determines which servers and/or POPs should store specific content objects.

The pre-caching content identifier 335 can further determine which type of storage resource (e.g., a solid-state drive, high-speed hard disk drives, or traditional hard disk drives) to use to store content objects or portions thereof. The determination can again be based on the predictions made by the usage prediction engine 330. Content objects or portions thereof predicted to be frequently requested, frequently accessed and/or requested or accessed prior to requesting or accessing other objects can be pre-cached in storage resources that can deliver high-speed responses to content requests. Content objects or portions thereof predicted to be requested or accessed at a lower frequency or later in a sequence of requests or accessed can be pre-cached in storage resources that deliver slower-speed responses to content requests. The determination can further be influenced based on, e.g., a content provider's prioritization of content objects, a content provider's level of service, a size of the content object, etc.

The pre-caching identifier 335 can also determine a time-to-live for the pre-cached objects. The time-to-live can again be based on the predictions made by the usage prediction engine 330. Content objects or portions thereof predicted to be frequently requested, frequently accessed and/or requested or accessed prior to requesting or accessing other objects can be given a longer time-to-live than content objects or portions thereof predicted to be requested or accessed less frequently or later in a sequence. In some instances, the time-to-live also or alternatively depends on a time period associated with the predictions made by the usage prediction engine 330. For example, the prediction can include a time-varying prediction as to a content object's request rate, and the time-to-live can be defined as a time period during which the prediction is above an absolute or relative threshold.

The determinations relating to content objects or portions thereof to pre-cache, a storage-resource type to use for pre-caching and/or a time-to-live for pre-caching, in some instances, initiates a series of automated events to effect the recommended pre-caching. In some instances, the determinations are presented to a CDN client or content provider. For example, an interface could recommend specific content objects or specific content-object portions (e.g., a first 8-seconds of a video content object) to pre-cache, a resource type for pre-caching specific content objects or portions thereof and/or a time-to-live. The recommendations can also or alternatively include a recommendation not to pre-cache or to stop pre-caching specific content objects or portions thereof. The client or content provider may then accept or reject the recommendations, thereby initiating a series of automated events to effect the recommendations. Alternatively, the client or content provider can use the recommendations to tailor storage policies.

Figure 4:
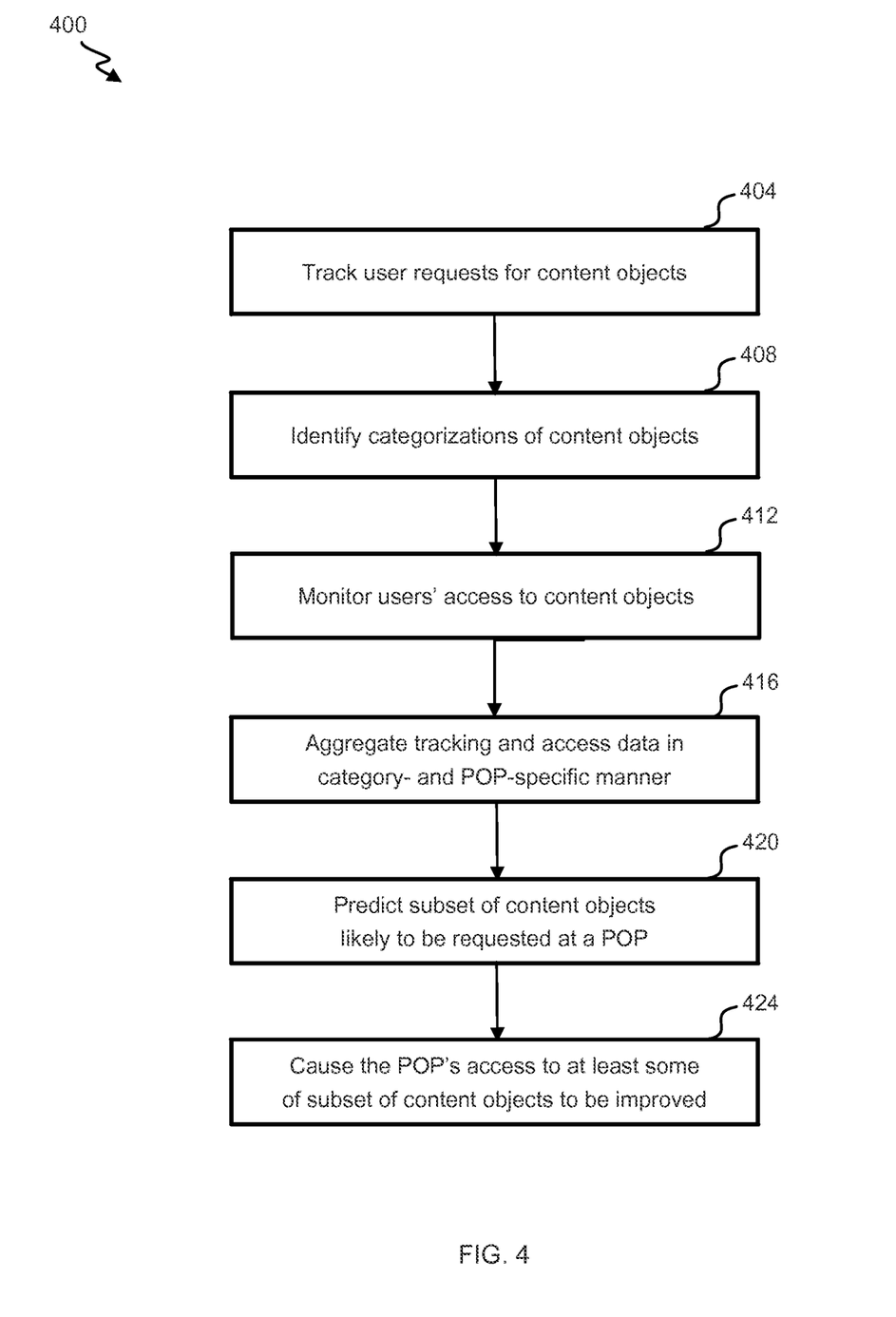
FIG. 4 illustrates a flowchart of an embodiment of a process for selecting content objects or portions thereof for pre-warming.

With reference to FIG. 4, a flowchart of an embodiment of a process 400 for selecting content objects or portions thereof for pre-warming is shown. The depicted portion of the process 400 begins in block 404 where the request monitor 305 tracks requests from end users for content objects. The request monitor 305 can detect information for each request, such as the requested content object, the requesting end-user system 102, and/or a date and time of the request.

The category detector identifies categorizations of content objects at block 408. These content objects can include those requested by the end users and/or other content objects. For example, the categorizations can be identified for all content objects provided by a content provider. For each content object, the categories can be defined as metadata tags provided for the object, and/or the categories can be determined based on a name and/or description of the object.

The usage monitor 330 monitors the end users' access to the requested content objects at block 412. Specifically, the usage monitor 330 can detect whether the content object was presented in its entirety to the end user system 102, or—if not—what portion was presented. The usage monitor 330 can further detect which content object(s) were subsequently requested by the end user system 102.

The usage prediction engine 330 aggregates the tracking and access data in a category- and POP-specific manner at block 416. The data may further be segregated based on, e.g., types of end-user systems 102, content providers providing content objects at issue and/or time period. In some instances, the tracking and access data available to the usage prediction engine is already specific to a POP or edge server, such that no further data distinction is required for POP-specific aggregation. The aggregated data can indicate content categories correlated with specific request rates or usage patterns. For example, the data may indicate that 70% of requesting users watch "funny animal" videos in their entirety, while 85% of requesting users watch only the first minute of "how-to" videos. The aggregated data can include a statistic (e.g., an average percentage of an object presented), a distribution (e.g., how frequently 0-5%, 5-10%, 10-15%, etc. of a content object was presented to requesting end user devices), a percentage or raw number (e.g., of end users requesting an object or requesting the object prior to another similar object), etc.

Based on the aggregated data, the usage prediction engine 330 predicts a subset of content objects likely to be requested at a POP at block 420. The subset can be a subset of a set of content objects provided by a content provider, a set of content objects to be distributed by a CDN and/or a set of content objects of a given type (e.g., video content objects, audio content objects, etc.). The prediction can be made by comparing a statistic, percentage or raw number from the aggregated data to an absolute or relative threshold, which may be fixed or may vary (e.g., across content providers). The prediction can include a set of predictions, such as a first subset of content objects likely to be requested by a first percentage of users, a second subset of content objects likely to be requested by a second percentage of users, etc. In some instances, the prediction includes a subset of content objects that are relatively unlikely to be requested by users or are likely to be requested by only a small percentage of users. Different predictions can further be made for different POPs and/or content providers.

The pre-caching content identifier 335 causes the POP's access to at least some of the subset of content objects to be improved at block 424. For example, all or a portion of the content objects can be pre-cached at the POP, the content objects can be stored in a high-speed memory device, such as a solid state drive and/or the content objects can be provided with a long time-to-live in a cache. In some instances, the subset of content objects is identified to a client of the CDN 110 or to a content provider, and the client or content provider can then accept an access-improving recommendation (e.g., to pre-cache specific content objects, to remove specific content objects from a cache, to implement a time-to-live, etc.) which causes the recommendation to take effect. Causing at least some of the subset of content objects to be pre-cached at the POP can include sending a request that the at least some content objects be transmitted to the POP. The request can be sent to an origin server or to another intra-CDN server.

Figure 5:
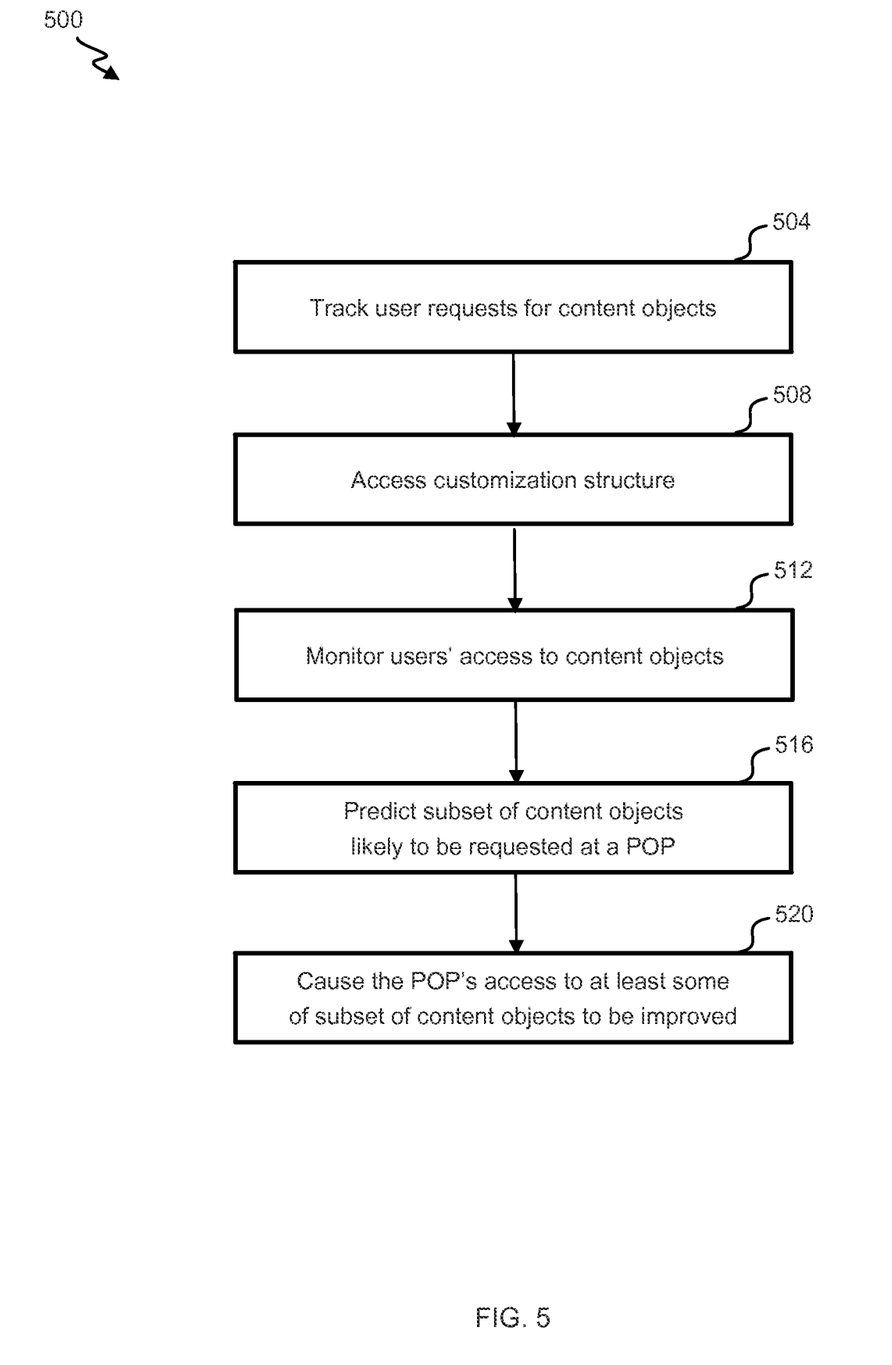
FIG. 5 illustrates a flowchart of an embodiment of a process for selecting content objects or portions thereof for pre-warming.

With reference to FIG. 5, a flowchart of an embodiment of a process 500 for selecting content objects or portions thereof for pre-warming is shown. The depicted portion of the process 500 begins in block 504 where the request monitor 305 tracks requests from end users for content objects. The requested content object can be a single object or a structure including multiple content objects. For example, a user can request access to an audio playlist structure that identifies a set of content objects—each of which is to be made available to the user in response to the request.

The customization-structure analyzer 315 accesses a customization structure at block 508. The customization structure can be associated with a request. For example, the customization-structure analyzer 315 can detect that the requested content object is a customization structure or file that, in response to the request, a customization structure or file is to be provided. The customization-structure analyzer 315 can identify specific content objects in the structure (or identified in a customization file) and an order that the specific content objects are to be provided.

The usage monitor 330 monitors the end users' access to the requested content objects at block 512. For example, the usage monitor 330 can detect whether the content objects identified in a customization file were provided or not, were provided in part or in full, and/or were provided in order or not.

Based on the accessed structure and/or the monitored usage data, the usage prediction engine 330 predicts a subset of content objects likely to be requested at a POP at block 516. The subset can be a subset of a set of content objects provided by a content provider, a set of content objects to be distributed by a CDN, a set of content objects of a given type (e.g., video content objects, audio content objects, etc.), and/or a set of content objects identified in a customization file of the accessed customization structure. In some instances, the POP is a POP which is estimated to be currently serving a specific end user 128 (e.g., associated with a particular customization structure). The estimation may be made by determining that an end user system 102 associated with the end user 128 recently requested another content object via an edge server in the POP.

The prediction can be based on content objects identified in a set of customization files, content objects identified in a single customization file, content objects accessed by a set of end user systems subsequent to having requested customization structures, or content objects accessed by a single end user system subsequent to having requested a customization structure. For example, if Content Object A is in 15% of accessed customization structures, but Content Object B is only in 1% of customization structures, it can be predicted that Content Object A is more likely to be requested than Content Object B. The prediction can further include a prediction about an order as to which content objects of the subset of content objects will be accessed. The order can include a same order as identified in the customization file and/or it can depend on the monitored usage data. For example, a prediction can be made that a user will desire quick access, subsequent to a customization-structure request, to a content object first in a customization file of the structure, or that users will desire quick access to content objects frequently of low-order number in customization files.

The pre-caching content identifier 335 causes the POP's access to at least some of the subset of content objects to be improved at block 520. For example, the at least some of the subset can include one or more content objects (in full or in part) of low order in one or more customization files. Improving access to content objects (or portions thereof) can include causing pre-caching the objects, storing the objects in a high-speed memory device and/or defining a long time-to-live for a cached instance of the objects. Causing at least some of the subset of content objects to be pre-cached at the POP can include sending a request that the at least some content objects be transmitted to the POP. The request can be sent to an origin server or to another intra-CDN server. The improved access can occur automatically or can depend on input from a client or content provider. For example, a client can be presented with recommended access-improving techniques, which the client can then accept or reject. As another example, a client can be presented with the predictions of the subset of content objects likely to be requested. The client can then revise policies based on the rejections to improve access to the subset of content objects.

In instances in which only a portion of a content object is stored, an extent of the portion can be determined based on an estimated time that will be required to retrieve a next portion (or a remainder) of the content object. For example, if it is estimated that an entire content object can be retrieved in 10 seconds, a pre-cached portion can be a 10-second portion, to allow sufficient time to retrieve the rest of the object while simultaneously providing the beginning of the object to the user.

Figure 6:
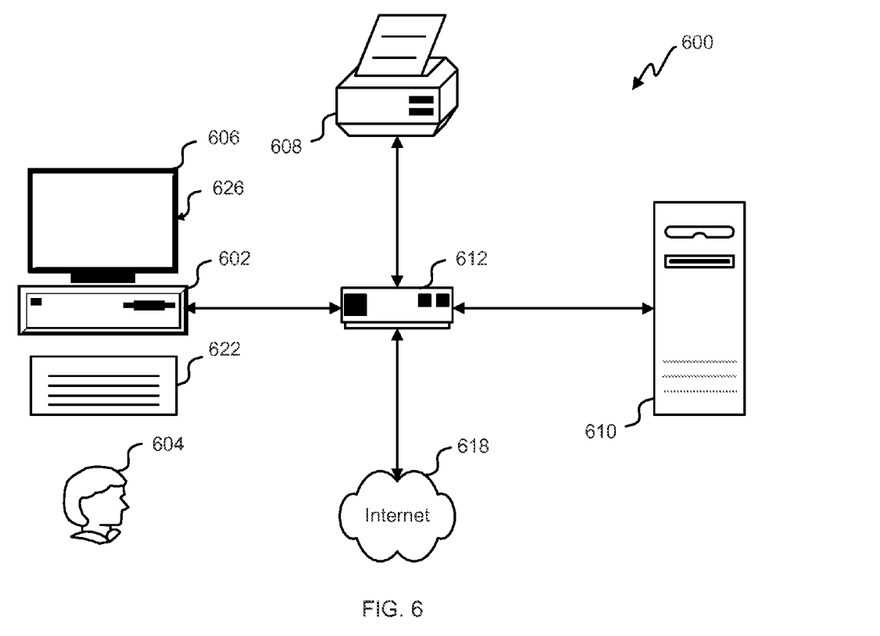
FIG. 6 depicts a block diagram of an embodiment of a computer system.

Referring next to FIG. 6, an exemplary environment with which embodiments may be implemented is shown with a computer system 600 that can be used by a designer 604 to design, for example, electronic designs. The computer system 600 can include a computer 602, keyboard 622, a network router 612, a printer 608, and a monitor 606. The monitor 606, processor 602 and keyboard 622 are part of a computer system 626, which can be a laptop computer, desktop computer, handheld computer, mainframe computer, etc. Monitor 606 can be a CRT, flat screen, etc.

A designer 604 can input commands into computer 602 using various input devices, such as a mouse, keyboard 622, track ball, touch screen, etc. If the computer system 600 comprises a mainframe, a designer 604 can access computer 602 using, for example, a terminal or terminal interface. Additionally, computer system 626 may be connected to a printer 608 and a server 610 using a network router 612, which may connect to the Internet 618 or a WAN.

Server 610 may, for example, be used to store additional software programs and data. In one embodiment, software implementing the systems and methods described herein can be stored on a storage medium in server 610. Thus, the software can be run from the storage medium in server 610. In another embodiment, software implementing the systems and methods described herein can be stored on a storage medium in computer 602. Thus, the software can be run from the storage medium in computer system 626. Therefore, in this embodiment, the software can be used whether or not computer 602 is connected to network router 612. Printer 608 may be connected directly to computer 602, in which case, computer system 626 can print whether or not it is connected to network router 612.

Figure 7:
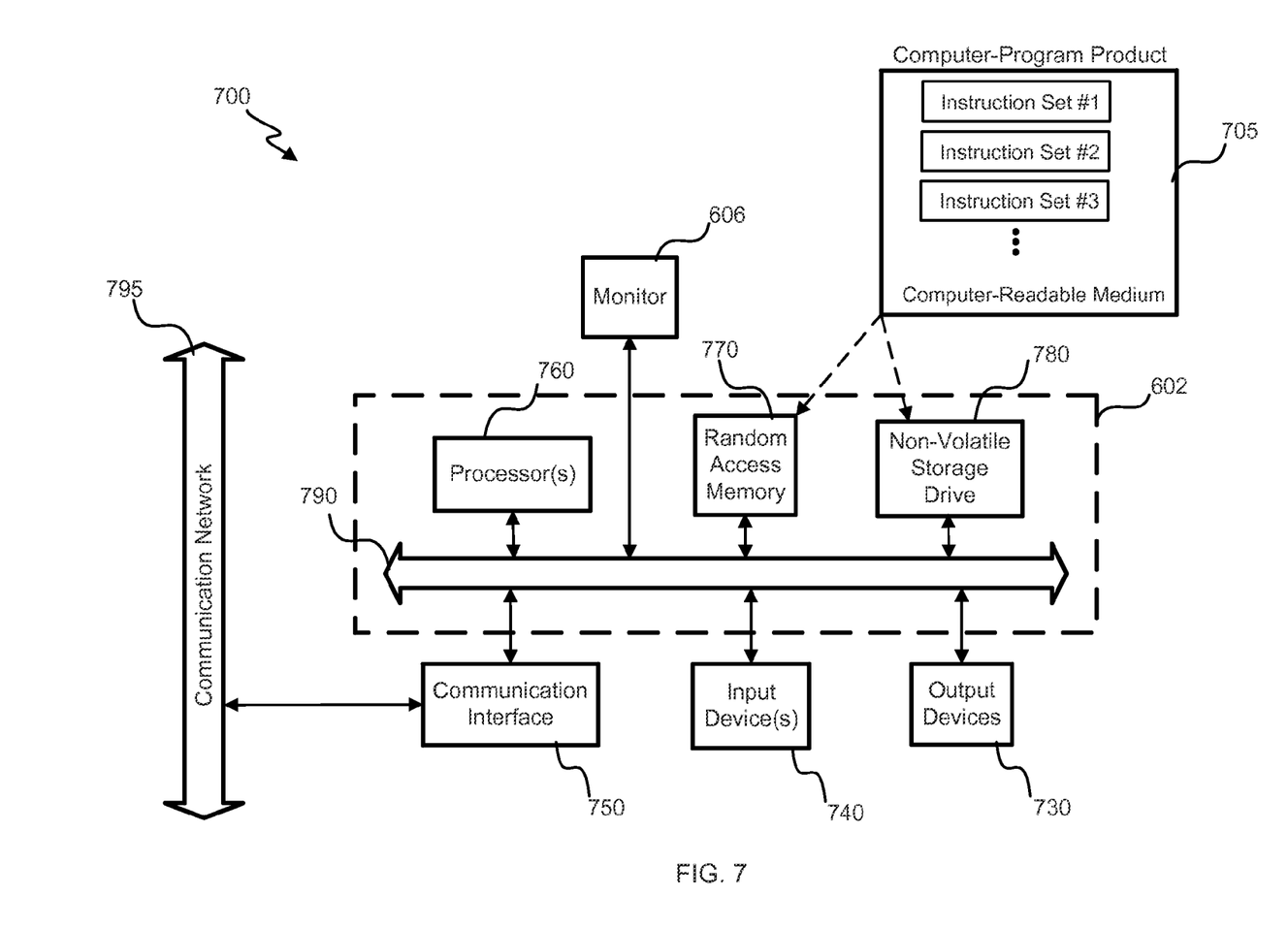
FIG. 7 depicts a block diagram of an embodiment of a special-purpose computer system.

With reference to FIG. 7, an embodiment of a special-purpose computer system 700 is shown. The content-request function 240 is an example of a special-purpose computer system 700. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 626, it is transformed into the special-purpose computer system 700.

Special-purpose computer system 700 comprises a computer 602, a monitor 606 coupled to computer 602, one or more additional user output devices 730 (optional) coupled to computer 602, one or more user input devices 740 (e.g., keyboard, mouse, track ball, touch screen) coupled to computer 602, an optional communications interface 750 coupled to computer 602, a computer-program product 705 stored in a tangible computer-readable memory in computer 602. Computer-program product 705 directs system 700 to perform the above-described methods. Computer 602 may include one or more processors 760 that communicate with a number of peripheral devices via a bus subsystem 790. These peripheral devices may include user output device(s) 730, user input device(s) 740, communications interface 750, and a storage subsystem, such as random access memory (RAM) 770 and non-volatile storage drive 780 (e.g., disk drive, optical drive, solid state drive), which are forms of tangible computer-readable memory.

Computer-program product 705 may be stored in non-volatile storage drive 790 or another computer-readable medium accessible to computer 602 and loaded into memory 770. Each processor 760 may comprise a microprocessor, such as a microprocessor from Intel® or Advanced Micro Devices, Inc.®, or the like. To support computer-program product 705, the computer 602 runs an operating system that handles the communications of product 705 with the above-noted components, as well as the communications between the above-noted components in support of the computer-program product 705. Exemplary operating systems include Windows® or the like from Microsoft Corporation, Solaris® from Sun Microsystems, LINUX, UNIX, and the like.

User input devices 740 include all possible types of devices and mechanisms to input information to computer system 602. These may include a keyboard, a keypad, a mouse, a scanner, a digital drawing pad, a touch screen incorporated into the display, audio input devices such as voice recognition systems, microphones, and other types of input devices. In various embodiments, user input devices 740 are typically embodied as a computer mouse, a trackball, a track pad, a joystick, wireless remote, a drawing tablet, a voice command system. User input devices 740 typically allow a user to select objects, icons, text and the like that appear on the monitor 606 via a command such as a click of a button or the like. User output devices 730 include all possible types of devices and mechanisms to output information from computer 602. These may include a display (e.g., monitor 606), printers, non-visual displays such as audio output devices, etc.

Communications interface 750 provides an interface to other communication networks and devices and may serve as an interface to receive data from and transmit data to other systems, WANs and/or the Internet 618. Embodiments of communications interface 750 typically include an Ethernet card, a modem (telephone, satellite, cable, ISDN), a (asynchronous) digital subscriber line (DSL) unit, a FireWire interface, a USB interface, a wireless network adapter, and the like. For example, communications interface 750 may be coupled to a computer network, to a FireWire® bus, or the like. In other embodiments, communications interface 750 may be physically integrated on the motherboard of computer 602, and/or may be a software program, or the like.

RAM 770 and non-volatile storage drive 780 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 770 and non-volatile storage drive 780 may be configured to store the basic programming and data constructs that provide the functionality of various embodiments of the present invention, as described above.

Software instruction sets that provide the functionality of the present invention may be stored in RAM 770 and non-volatile storage drive 780. These instruction sets or code may be executed by processor(s) 760. RAM 770 and non-volatile storage drive 780 may also provide a repository to store data and data structures used in accordance with the present invention. RAM 770 and non-volatile storage drive 780 may include a number of memories including a main random access memory (RAM) to store of instructions and data during program execution and a read-only memory (ROM) in which fixed instructions are stored. RAM 770 and non-volatile storage drive 780 may include a file storage subsystem providing persistent (non-volatile) storage of program and/or data files. RAM 770 and non-volatile storage drive 780 may also include removable storage systems, such as removable flash memory.

Bus subsystem 790 provides a mechanism to allow the various components and subsystems of computer 602 communicate with each other as intended. Although bus subsystem 790 is shown schematically as a single bus, alternative embodiments of the bus subsystem may utilize multiple busses or communication paths within computer 602.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A content delivery network (CDN) for streaming content over the Internet to end user systems, the CDN comprising:
   a content request interface that receives requests, using one or more processors, for streaming a plurality of content objects to end user systems;
   an edge server selection function that assigns, using one or more processors, each request to an edge server for streaming the plurality of content objects to the end user systems;
   a streaming function that streams, using one or more processors, the plurality of content objects to the end user systems; and
   a content-request function, wherein the content-request function, using one or more processors:
      identifies, for each request received by the content request interface, a category for each of the plurality of content objects, wherein the category for each of the plurality of content objects is identified based on an analysis of the subject matter of each of the plurality of content objects,
      stores the category for each of the plurality of content objects,
      monitors, for each request received, a first portion of each of the plurality of content objects that was streamed to a requesting end user system, wherein the first portion is less than an entire content object,
      generates aggregated data to determine a playback time, wherein:
         the playback time corresponds to a specific category of content objects of the plurality of content objects; and
         the playback time is equal to a statistical usage pattern of first portions of the plurality of content objects that belong to the specific category,
      predicts a second portion of a second content object, wherein:
         the second content object is not part of the plurality of content objects,
         the second content object is identified to be part of the specific category, and
         the second portion has a playback length equal to the playback time based on the second content object being identified to be part of the specific category, and
      causes access to the second portion of the second content object to be improved such that the second portion of the second content object is set to be provided faster in response to a request for the second content object than would otherwise occur.

2. The CDN for streaming content over the Internet to the end user system as recited in claim 1, wherein causing access to the second content object to be improved includes causing the second content object to be cached at an edge server.

3. The CDN for streaming content over the Internet to the end user system as recited in claim 1, wherein, for each request received by the content request interface, the category of the requested content object is identified based on metadata of the requested content object.

4. The CDN for streaming content over the Internet to the end user system as recited in claim 1, wherein the content-request function further:
monitors, for each request received by the content request interface, what portion of the request was streamed to the requesting end user system, and
predicts that a portion of the second content object will be provided in response to future requests,
wherein causing access to the second content object to be improved comprises causing access to the portion of the second content object to be improved.

5. The CDN for streaming content over the Internet to the end user system as recited in claim 1, wherein predicting that the second content object will be requested in the future comprises predicting that a particular user will request the second content object.

6. The CDN for streaming content over the Internet to the end user system as recited in claim 5, wherein the content-request function further estimates an edge server that will be serving the user in the future, and wherein causing access to the second content object to be improved includes causing the second content object to be cached at the edge server.

7. The CDN for streaming content over the Internet to the end user system as recited in claim 1, wherein predicting that the second content object will be requested comprises predicting that the second content object will be requested more than a threshold number of times.

8. The CDN for streaming content over the Internet to the end user system as recited in claim 1, wherein the generated aggregated data is indicative of an amount of requests assigned to a specific point of presence (POP) of the CDN being for content objects with the specific category, and wherein the prediction comprises a prediction that the specific POP will receive a future request for the second content object.

9. A method for streaming content over the Internet via a CDN to end user systems, the method comprising:
tracking requests from end user systems for streaming content objects being handled by the CDN to identify a plurality of content objects being requested;
identifying a category for each of the plurality of content objects, wherein the category for each of the plurality of content objects is identified based on an analysis of the subject matter of each of the plurality of content objects;
storing the category for each of the plurality of content objects;
monitoring, for each request received, a first portion of each of the plurality of content objects that was streamed to a requesting end user system, wherein the first portion is less than an entire content object;
generating aggregated data to determine a playback time, wherein:
the playback time corresponds to a specific category of content objects of the plurality of content objects; and
the playback time is equal to a statistical usage pattern of first portions of the plurality of content objects that belong to the specific category;
predicting that a second portion of a second content object, wherein:
the second content object is not part of the plurality of content objects;
the second content object is identified to be part of the specific category; and
the second portion has a playback length equal to the playback time based on the second content object being identified to be part of the specific category; and
causing access to the second portion of the second content object to be improved such that the second portion of the second content object is set to be provided faster in response to a request for the second content object than would otherwise occur.

10. The method for streaming content over the Internet to the end user system as recited in claim 9, wherein causing access to the second content object to be improved includes causing the second content object to be cached at an edge server in the CDN.

11. The method for streaming content over the Internet to the end user system as recited in claim 9, wherein, for each request received by the content request interface, the category of the requested content object is identified based on metadata of the requested content object.

12. The method for streaming content over the Internet to the end user system as recited in claim 9, further comprising:
monitoring, for each request of the tracked requests, what portion of the request was streamed to the requesting end user system; and
predicting that a portion of the second content object will be provided in response to future requests,
wherein causing access to the second content object to be improved comprises causing access to the portion of the second content object to be improved.

13. The method for streaming content over the Internet to the end user system as recited in claim 9, wherein predicting that the second content object will be requested in the future comprises predicting that a particular user will request the second content object.

14. The method for streaming content over the Internet to the end user system as recited in claim 13, further comprising estimating an edge server of the CDN that will be serve the user in the future, wherein causing access to the second content object to be improved includes causing the second content object to be cached at the edge server.

15. The method for streaming content over the Internet to the end user system as recited in claim 9, wherein predicting that the second content object will be requested comprises predicting that the second content object will be requested more than a threshold number of times.

16. The method for streaming content over the Internet to the end user system as recited in claim 9, wherein the generated aggregated data is indicative of an amount of requests assigned to a specific point of presence (POP) of the CDN being for content objects with the specific category, and wherein the prediction comprises a prediction that the specific POP will receive a future request for the second content object.

17. A system for streaming content over the Internet to end user systems, the system comprising:
one or more processors; and
one or memories coupled with said one or more processors, wherein the one or more processors and one or more memories are configured to:

track requests from end user systems for streaming a plurality of content objects;
identify a category for each of the plurality of content objects, wherein the category for each of the plurality of content objects identified based on an analysis of the subject matter of each of the plurality of content objects;
store the category for each of the plurality of content objects;
monitor, for each request received, a first portion of each of the plurality of content objects that was streamed to a requesting end user system, wherein the first portion is less than an entire content object;
generate aggregated data to determine a playback time, wherein:
    the playback time corresponds to a specific category of content objects of the plurality of content objects; and
    the playback time is equal to a statistical usage pattern of first portions of the plurality of content objects that belong to the specific category;
predict that a second portion of a second content object, wherein:
    the second content object is not part of the plurality of content objects;
    the second content object is identified to be part of the specific category; and
    the second portion has a playback length equal to the playback time based on the second content object being identified to be part of the specific category; and
cause access to the second portion of the second content object to be improved such that the second portion of the second content object is set to be provided faster in response to a request for the second content object than would otherwise occur.

18. The system for streaming content over the Internet to the end user system as recited in claim 17, wherein causing access to the second content object to be improved includes causing the second content object to be cached.

19. The system for streaming content over the Internet to the end user system as recited in claim 17, wherein, for each request received by the content request interface, the category of the requested content object is identified based on metadata of the requested content object.

20. The system for streaming content over the Internet to the end user system as recited in claim 17, wherein the one or more processors and one or more memories are further configured to:
monitor, for each request of the tracked requests, what portion of the request was streamed to the requesting end user system; and
predict that a portion of the second content object will be provided in response to future requests,
wherein causing access to the second content object to be improved comprises causing access to the portion of the second content object to be improved.

\* \* \* \* \*